June 3, 1941.                H. A. S. HOWARTH                 2,243,961
                                  BEARING
                          Filed July 17, 1937              5 Sheets-Sheet 1

Inventor
Harry A. S. Howarth.
By Cameron, Kerkam & Sutton.
Attorneys

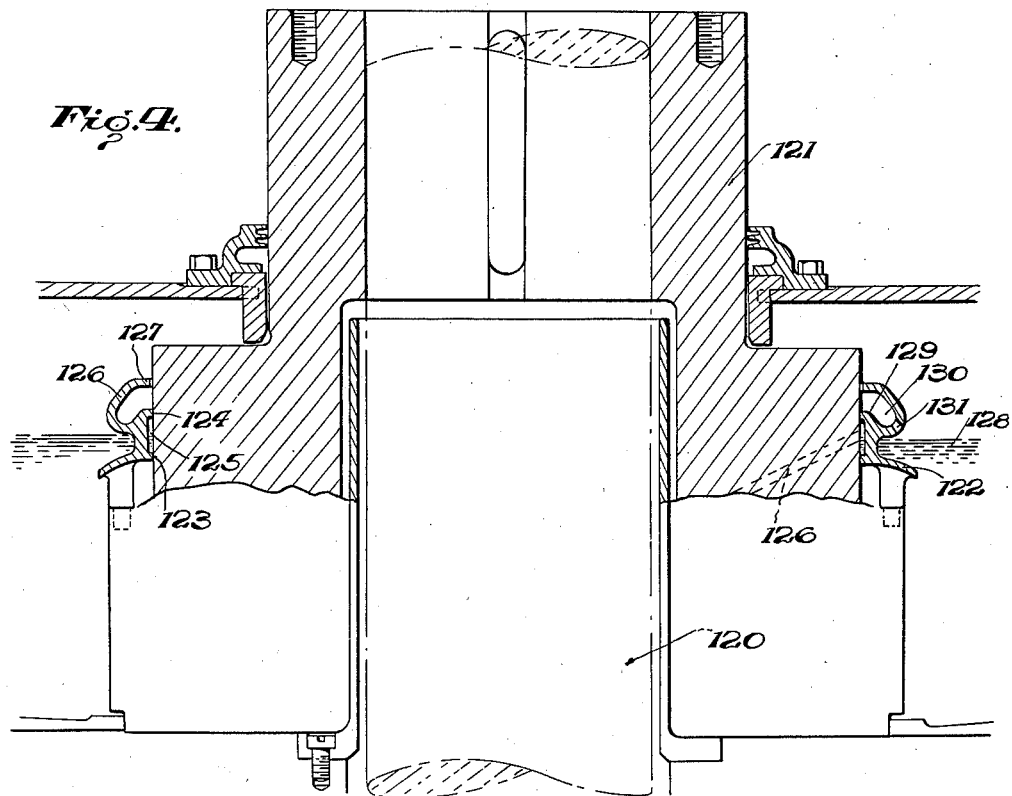
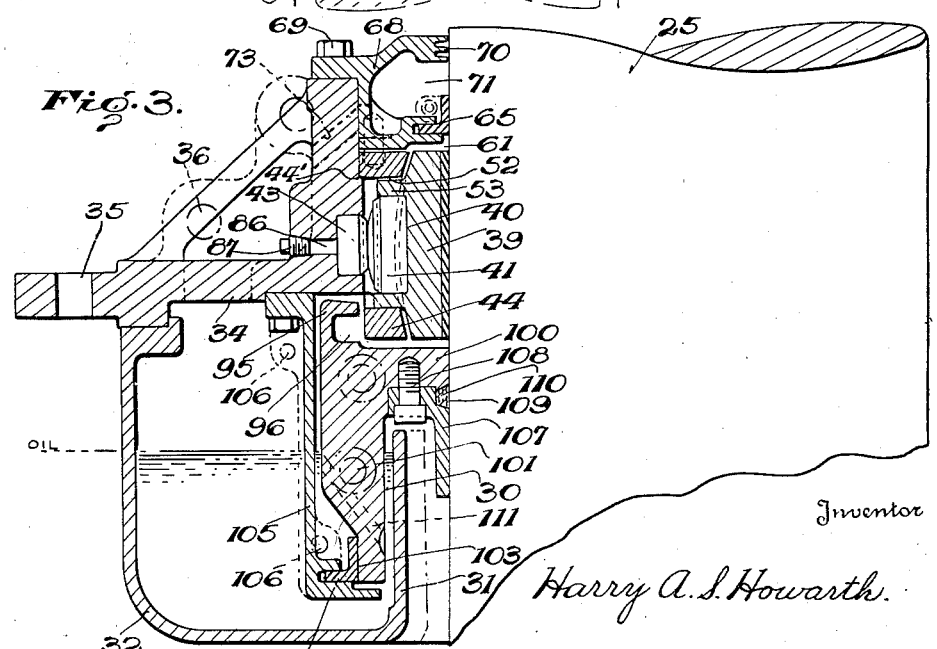

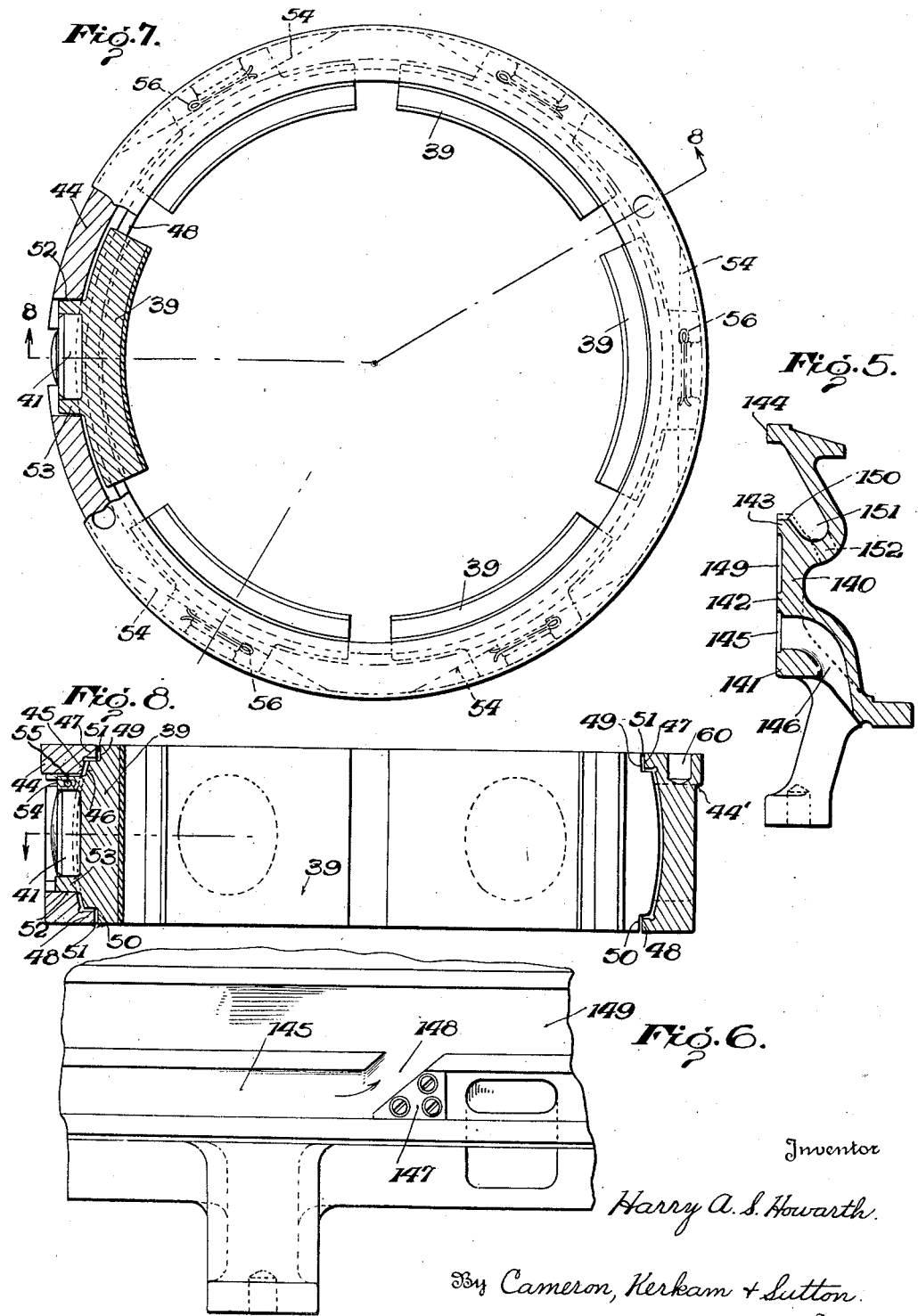

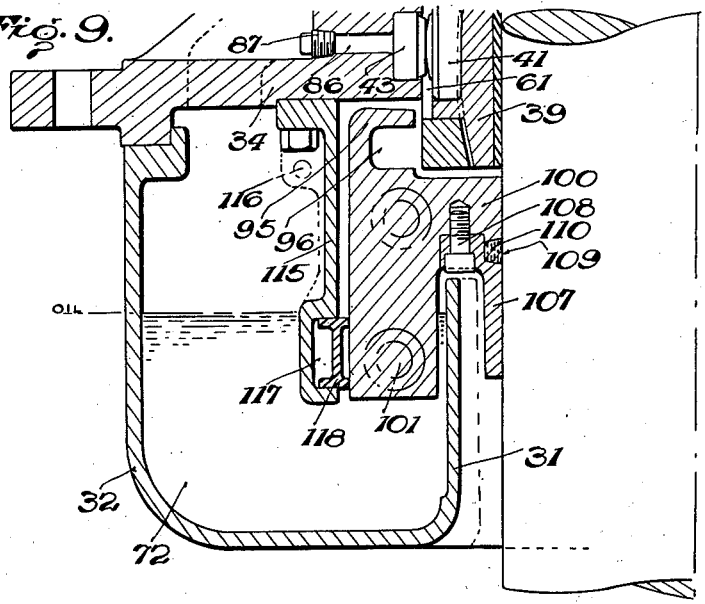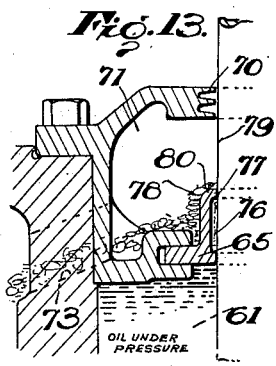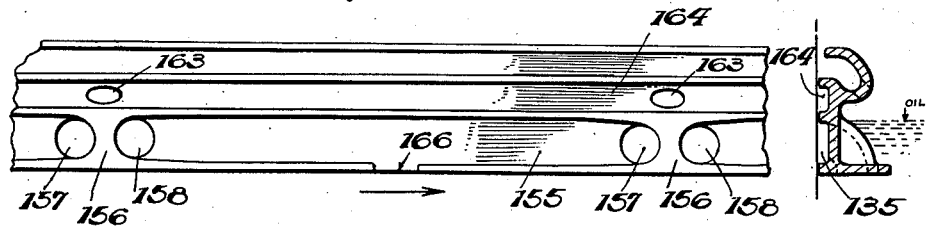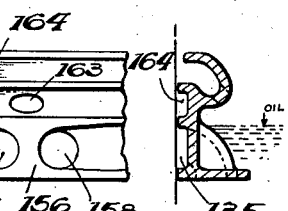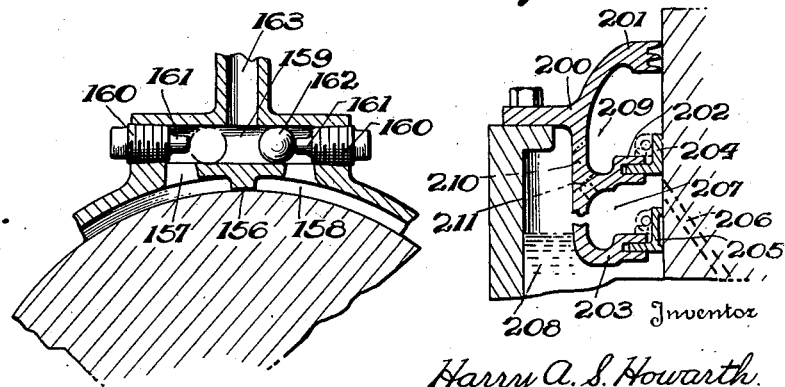

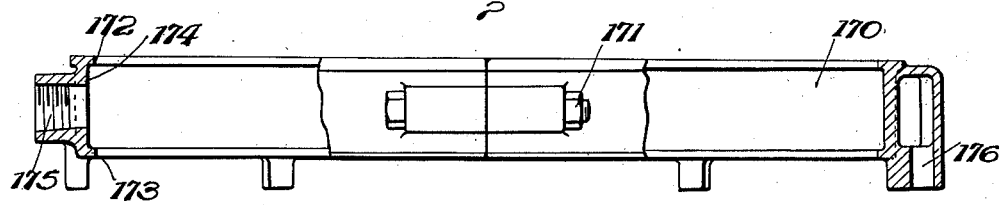
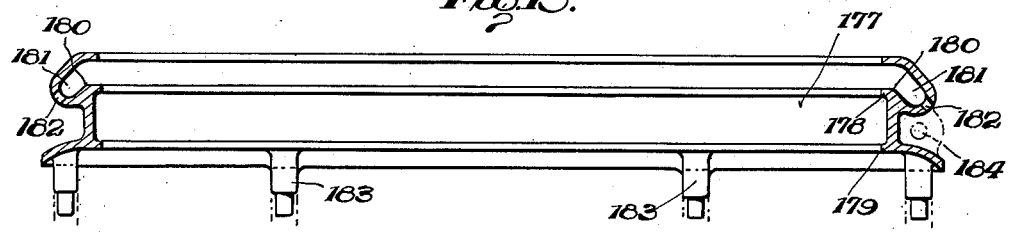
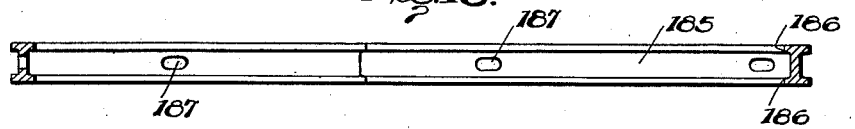
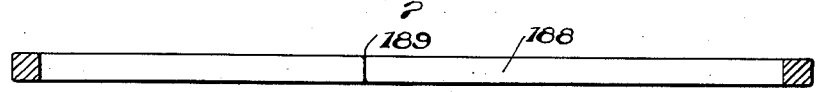
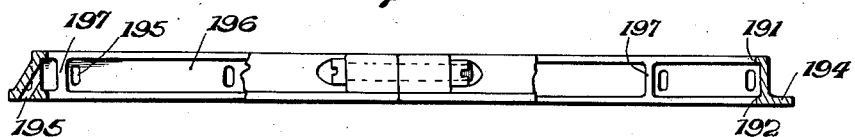
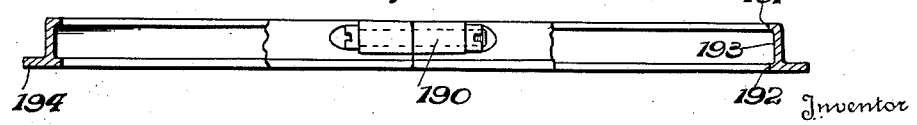

Patented June 3, 1941

2,243,961

UNITED STATES PATENT OFFICE 2,243,961

BEARING

Harry A. S. Howarth, Philadelphia, Pa., assignor to Kingsbury Machine Works, Inc., Philadelphia, Pa., a corporation of Delaware Application July 17, 1937, Serial No. 154,290

50 Claims. (Cl. 308—73)

This invention relates to bearings, and more particularly to radial bearings either alone or associated with thrust bearings, although as will hereinafter appear certain features of the invention are also applicable to thrust bearings per se.

It is an object of this invention to provide a bearing with improved means to prevent aeration of the oil where, owing to the relative rotation of parts, there is a tendency for air to be drawn into the oil.

Another object of this invention is to provide a bearing with improved means for developing and maintaining a body of oil at superatmospheric pressure which will flow outwardly and thereby prevent the inward flow of air where, owing to the relative rotation of parts, there is otherwise a tendency for air to be drawn into the oil.

Another object of this invention is to provide a bearing with means of the character last referred to which is so constructed as to substantially assure against mixture of air with the oil where the oil at superatmospheric pressure passes outwardly into contact with the air.

Another object of this invention is to provide a thrust bearing with improved means for maintaining oil at superatmospheric pressure where the surface of the oil in the well or reservoir would otherwise contact the periphery of the rotatable thrust block, thrust collar or other rotatable bearing member and which is so constructed that any drawing of air into the oil is substantially prevented.

Another object of this invention is to provide a radial bearing with improved means which assure that the radial bearing surfaces are adequately lubricated by a body of oil under pressure and from which the oil may flow under conditions substantially assuring against aeration thereof.

Another object of this invention is to provide a radial bearing of the pivoted shoe type with improved lubricating means whereby said shoes are maintained immersed in a body of oil under superatmospheric pressure all of the time that the bearing is in operation.

Another object of this invention is to provide a bearing as last characterized with means whereby the oil may flow from said body of oil under pressure without substantial aeration thereof.

Another object of this invention is to provide an improved radial bearing of the pivoted shoe type having means for maintaining the shoes immersed in a body of oil under pressure which may be supplied thereto either by centrifugal or by viscosity pumping means as preferred.

Another object of this invention is to provide a radial bearing of the pivoted shoe type with improved means for mounting the shoes whereby they may be readily assembled as a unit exteriorly of the bearing and which unit may be readily standardized for various bearings both for horizontal and for vertical shafts.

Another object of this invention is to provide lubricating means for a radial bearing with improved mounting means therefor assuring the desired length of fit with the shaft or other rotating element without undue reduction in the height of the oil confining walls.

Another object of this invention is to provide a bearing with improved sealing means which may be adapted to either thrust or radial bearings.

Another object of this invention is to provide a bearing with means which may be readily standardized for use either as a viscosity pumping means or as a sealing means as desired.

Other objects of this invention will appear as the description thereof proceeds.

The invention is capable of receiving a variety of mechanical expressions, several of which for purposes of exemplification have been shown on the accompanying drawings, but it is to be expressly understood that the illustrated embodiments have been chosen to show various ways in which the invention may be embodied, and are not intended as a definition of the limits of the invention, reference being had to the appended claims for that purpose.

Referring in detail to the accompanying drawings, wherein the same reference characters are employed to designate corresponding parts in the several figures, Fig. 1 is a half axial section of a radial bearing embodying the present invention;

Fig. 3 is a half axial section of yet another embodiment of the present invention;

Fig. 4 is a somewhat schematic sectional view illustrating the application of a feature of the present invention to thrust bearings;

Figs. 5 and 6 are respectively a sectional view and a fragmentary elevational view of another embodiment of the present invention for application to thrust bearings, the same being shown to enlarged scale;

Figs. 7 and 8 are respectively a plan view, partly in section, and a sectional view, on line 8—8 of Fig. 7, illustrating improved means for mounting the radial bearing shoes;

Fig. 9 is a half section illustrating another form of pumping means that may be incorporated in the various embodiments of the present invention;

Figs. 10 and 11 are respectively a fragmentary developed view and a sectional view illustrating another form of sealing means which may be used in conjunction with a thrust bearing;

Fig. 12 is an enlarged fragmentary view to illustrate valve means employed in the embodiment of Figs. 10 and 11;

Fig. 13 is an enlarged fragmentary view to illustrate the flow of oil from the upper sealing ring in various embodiments of the present invention;

Fig. 14 is an elevational view partly in section of one form of viscosity pump that may be used in conjunction with the present invention;

Fig. 15 is a sectional view of one form of sealing ring embodying the present invention;

Figs. 16, 17, 18 and 19 are detailed views of various pumping and sealing rings; and Fig. 20 is a somewhat schematic view to illustrate the principles underlying the present invention and to correlate the various embodiments thereof.

Figure 1:
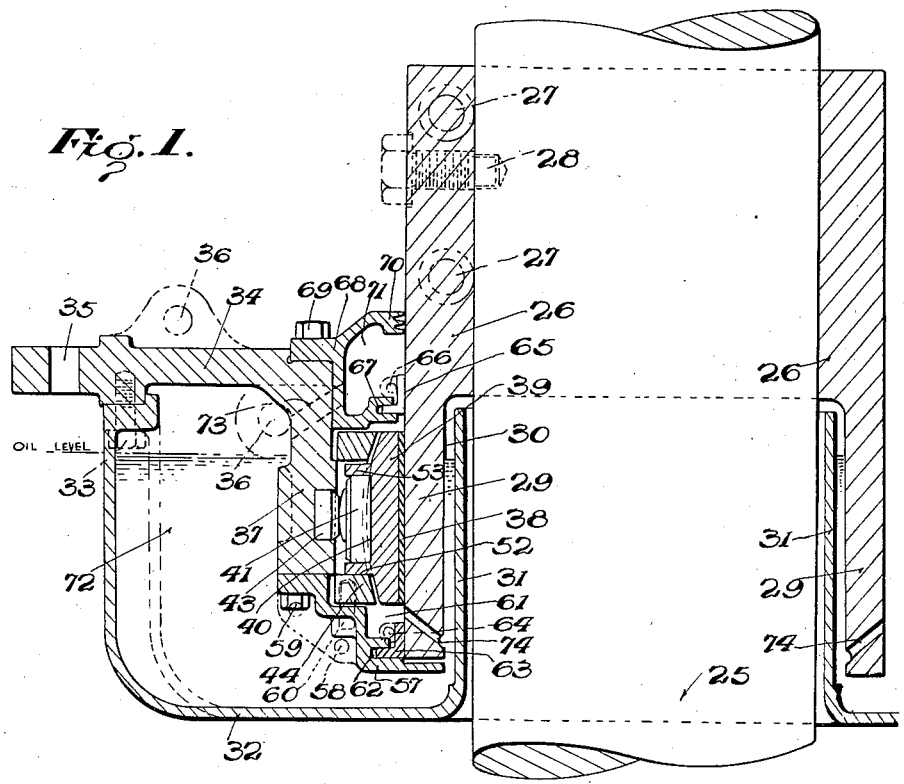
Figure 2:
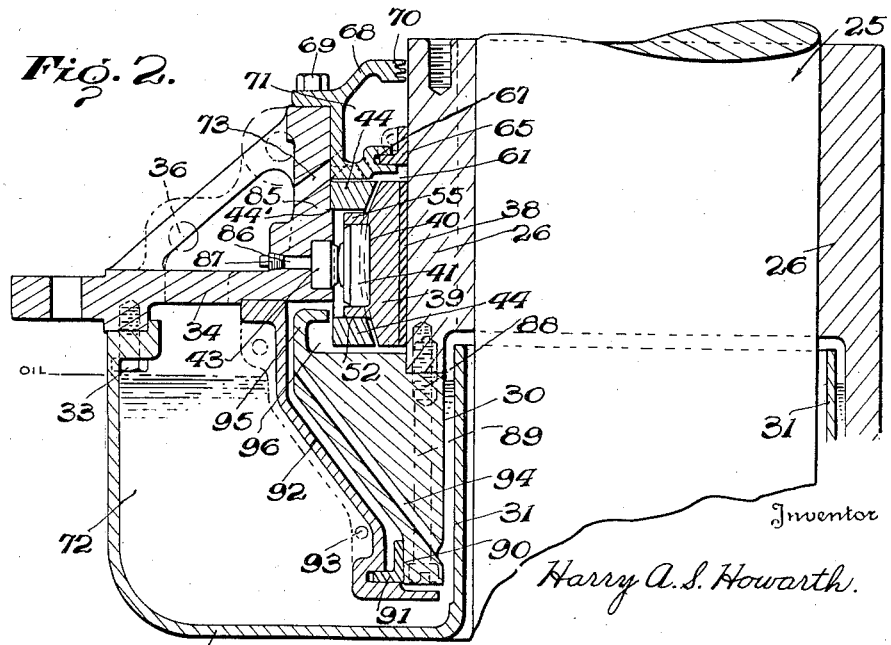
Fig. 2 is a half axial section of another embodiment of the present invention.

Referring first to Figs. 1, 2 and 3, the invention is here shown as applied to the lubrication of radial bearings per se, but it is to be expressly understood that the present invention is equally applicable to the lubrication of radial bearings when associated with thrust bearings, whether of the pivoted shoe or any other suitable type and whether the thrust bearing elements have plane or spherical bearing surfaces. While in conformity with the present invention the radial bearing is preferably made of the pivoted shoe type because of its self-aligning characteristics, certain features of the present invention are not limited to the use of pivoted shoes as will be apparent from the following description, and therefore as respects the broader aspects of the present invention it is to be expressly understood that the radial bearing may be of the surface type or of the ball type as well as the pivoted shoe type.

In the form shown in Fig. 1, the shaft 25 has formed thereon or attached thereto in any suitable way a bearing sleeve 26, which may be made in one piece or in halves suitably secured together as by bolts or screws 27, the same being suitably fastened to the shaft to prevent relative rotation therebetween, as by the screw or dowel 28. In this embodiment the radial bearing is designed to run immersed, in whole or in part, in a body of oil, and therefore the sleeve 26 is provided with an axial extension 29 which is bored to a larger diameter than the shaft as shown at 30 to receive the inner wall 31 of an oil pot 32 which may be of any suitable construction; thus it may be formed in halves to be secured around the shaft or it may be made in one piece and in either event the inner wall 31 may be made integral with the remainder of the pot or it may be made separate therefrom and suitably secured thereto. Pot 32 is mounted in position in any suitable way, the same being shown as secured from below, as by bolts or screws 33, to the under side of a mounting member 34, so that said pot may be removed as a unit downwardly with respect to said member 34, but if preferred the means of attachment may be made accessible from above. Member 34 may be the cover of the bearing housing, or it may be an annular member supported on the frame of the machine in any suitable way, as by bolts or screws at 35. Member 34 is preferably made in halves suitably secured together as by bolts or screws at 36, to facilitate assembly and disassembly, and as here shown it includes a depending portion 37 which may be formed integrally with or suitably attached to the upper or main portion of said member 34.

Cooperating with the peripheral bearing surface 38 of the sleeve portion 29 are any suitable number of tiltably mounted bearing shoes 39, which may be of any suitable size, construction and manner of support. As here shown, each of said shoes 39 has suitably secured within a recess 40 at the rear thereof a block 41 having a spherical surface of contact with a supporting block 43 carried by the depending portion 37 of the member 34. Preferably, said shoes are adapted to be assembled with a cage exteriorly of the bearing so that they may be introduced and withdrawn in unitary relationship with said cage. This also facilitates the development of standardized units that may be applied to various bearings whether for vertical or horizontal shafts.

Referring more particularly to Figs. 7 and 8 which show the preferred construction of cage and shoes, cage 44, which may be made in one piece or in two or more pieces as preferred to facilitate assembly and disassembly, and which when made in two or more sections may be assembled by merely abutting said sections or bolting the same together as preferred, takes the form of a ring which at its inner face is preferably curved spherically as illustrated at 45, the shoes 39 also being preferably curved spherically at their rear faces, or provided with approximating flat surfaces, as shown at 46 so as to reduce the clearance spaces within the ring. At each extremity cage ring 44 has inwardly directed flanges or lips 47 and 48 which mate with grooves or recesses 49 and 50 in the shoes. Therefore, as shown in Fig. 7 each shoe is free to tilt in a circumferential direction in order to establish and maintain the appropriate bearing films, and also owing to the clearance at 51 each shoe is free to tilt in an axial direction to take up its proper alignment with the rotatable bearing surface and therefore provide for the self-aligning action of this type of radial bearing, but at the same time the interaction between the lips 47 and 48 of the cage ring and the grooves 49 and 50 of the shoes prevents rotation of each shoe around its own axis with respect to the cage ring. However, the lips and grooves may be omitted as in Fig. 1, and reliance placed on the means for retaining the shoes in the cage ring for preventing rotation of the shoes. Also the cage ring may be further lightened than illustrated by removing portions thereof if it is so mounted that spaces left thereby at the rear thereof are readily drained to the oil well for reasons which will hereinafter appear.

Each shoe may be retained in the cage ring against inward movement with respect thereto in any suitable way. As shown the cage ring is provided with apertures 52, corresponding in number with the shoes, to receive the projecting portions 53 which carry the blocks 41, and it is also provided with tangential slots 54 at one side, preferably the upper side, of said apertures 52, while the projecting portions 53 are provided with apertures 55 in the plane of said slots 54 so that cotter pins, wires or other suitable locking elements 56 may be passed through said apertures 55 and, by engagement in the slots 54, loosely retain said shoes in position. Thus the shoes may be assembled with the cage ring 44 or its sections exteriorly of the bearing and the units so formed constitute standardized units which may be applied to various bearings of different constructions, types, etc.

The cage ring 44 may be retained in position in any suitable way, depending upon whether it is preferred to introduce the same from above or from below. If, as shown in Fig. 1, the cage ring with its assembled shoes is to be mounted from below, said cage ring may be retained in position by a ring 57, which may be made in one piece or in two or more pieces suitably secured together as by bolts or screws at 58, and which may be secured to the lower extremity of extension 37 in any suitable way, as by screws or bolts 59. Said cage ring 44 may also be prevented from relative rotation by suitably arranged dowels, as at 60.

In conformity with the present invention the radial bearing shoes 39 are preferably confined within a substantially oil-tight space 61, so that said shoes may be made to run immersed in a body of oil which is maintained under a substantial pressure. In order that the oil-containing space within the chamber 61 may be kept at a minimum the internal walls of the cage ring preferably conform more or less closely to the configuration of the shoes, as heretofore referred to at 45 and 46, so that except for suitable clearances to provide for the desired relative movement of the shoes with respect to the cage ring as above referred to, there are no large spaces to be filled with oil. If as before mentioned the spaces at the rear of the ring can be readily drained to the well, the ring may be made of somewhat lighter construction in some bearings than illustrated. The chamber 61 containing the shoes is closed at top and bottom by oil sealing rings, and in order to keep the clearance between each sealing ring and the rotatable member associated therewith as small as possible, each of said sealing rings is preferably so mounted that it may float with respect to its supporting means, whereby the clearance is maintained notwithstanding any lack of alignment or concentricity of the relatively rotatable members. Preferably the clearance between at least the upper sealing ring and its associated rotatable member is made less than the running clearance between the bearing shoes and the bearing surface on the shaft.

As shown, the retaining ring 57 has an inwardly directed peripheral groove or recess 62, adjacent its lower extremity, and mounted therein is an L-shaped sealing ring 63, which may be made in halves suitably connected together as by bolts or screws at 64. The upper end of the chamber 61 is also closed by a sealing ring 65, which may be made in halves connected together as by bolts or screws at 66, said ring 65 also being floatingly mounted in groove 67 of a ring 68 suitably secured to the member 34, as by bolts or screws 69. At its upper extremity ring 68 has a comb 70, and between ring 65 and comb 70 said ring 68 provides an oil receiving chamber 71 which communicates with the oil well 72 through one or more apertures 73 formed in the wall of ring 68 and in member 34 or its extension 37. If desired said chamber 71 may be subdivided by an intermediate arm carrying a comb or sealing ring, as in other embodiments to be described, to separate the oil in the lower chamber from the space immediately below the comb 70 when external pressure conditions so require to avoid withdrawal of oil vapor or disturbance of the oil levels.

Oil may be pumped under pressure into said chamber 61 in any suitable way. As here shown, the lower portion of extension 29 on bearing sleeve 26 is provided with one or more inwardly and upwardly directed apertures or passages 74 which at one extremity communicate with the oil well 72 and at the other extremity communicate with the shoe-containing chamber 61. Therefore, the passage or passages 74 function as a centrifugal pump to pump the oil from the reservoir 72 into the chamber 61. In place of a centrifugal pump as illustrated, a viscosity pump may be used, as by replacing the sealing ring 63 by a viscosity pumping ring, as hereinafter explained more fully in conjunction with Fig. 9.

Oil is withdrawn from the oil well 72 and forced into the chamber 61, completely filling all of the cavities therein and maintaining said oil under a substantial superatmospheric pressure. The bearing shoes 39 therefore run immersed in the oil in said chamber 61, and the pressure on said oil causes the oil to flow outwardly between the sealing ring 65 and the peripheral surface of the sleeve 26. This outward flow of the oil between the relatively movable surfaces of 26 and 65 assures against air being drawn into the chamber 61 between said relatively movable surfaces, and thereby the aeration of the oil that would result if air were drawn into chamber 61 is prevented. Oil flowing upwardly through the small clearance between said sealing ring 65 and the peripheral surface of sleeve 26 must in turn avoid drawing air thereinto if aeration is to be prevented. If the escaping oil entered a recess or space in which the contact of the relatively rotatable member therewith could cause swirling, churning, etc., air would be drawn into the oil. To prevent such aeration, the sealing ring 65, in conformity with the present invention, is extended upwardly above the adjacent stationary member so that all oil passing between said ring 65 and the surface of sleeve 26 must flow downwardly and away from said ring 65 in a thin sheet or film as soon as it has reached the upper extremity of ring 65.

Referring particularly to Fig. 13 which shows the upper sealing ring in larger section, said ring is here shown as grooved or relieved at 76 for a major portion of its width, so as to reduce friction to a minimum, although this is not essential, as, if preferred, the ring 65 may have an inner cylindrical surface of uniform diameter as indicated in Fig. 1. The clearances at both the upper and the lower limits of the groove 76 may be made the same or if preferred only the upper clearance at 77 may be made of the small size heretofore referred to to control the outward flow of the oil. The oil under pressure escaping from the chamber 61 first fills said groove 76 and thereafter may escape through the clearance at 77 over the uppermost edge of the ring 65. From here the oil must flow downwardly as indicated at 78, and therefore it immediately leaves the relatively rotating surface 79, and cannot be churned or aerated thereby. Inasmuch as the clearance at 77 is relatively small the oil flows therefrom in the form of a continuous but relatively thin film which descends on the exterior surface of the ring 65, and said surface may be rounded as indicated at 80, if desired, so that the outer surface of the ring 65 shall have no tendency to cause any interruption or irregularity of flow in said film.

The embodiment of Fig. 1 has the advantage that all of the parts of the bearing with its lubricating means are readily accessible and removable from below. After removing the screws 33 the pot 32 may be lowered as a unit; after removing screws 59 the ring 57 may be removed as a unit or its halves may be withdrawn radially after removal of the bolts 58; then the cage ring 44 with its assembled shoes may be lowered and withdrawn. However, the cage ring and its shoes in this embodiment are also accessible from above after ring 68, which may also be made in halves if preferred, is withdrawn following removal of screws 69, and if desired the member 34 may be so assembled with the pot 32 that it is separable therefrom from above.

In the form shown in Fig. 2, the radial bearing is disposed above the level of the oil, rather than below the level of the oil, but otherwise this embodiment in its major features corresponds with the embodiment of Fig. 1, like reference numerals indicating like parts, except as herein noted. As here shown, the member 34 has an upwardly extending portion 85 which may be integral therewith or suitably attached thereto, and as in the embodiment of Fig. 1 said portion 85 affords a mounting for the bearing shoes 39 assembled with their cage ring 44, but here shown as mounted above the level of the oil in the pot by engaging shoulders at 44' on said ring and upwardly extending portion. In this embodiment, however, apertures 86 are shown as drilled through the portion 85 at the rear of the blocks 43 to facilitate removal thereof, so that the bearing clearance may be adjusted by removing said blocks and grinding the same or introducing shims between the blocks and the bottoms of their recesses. Said apertures 86 may be closed in any suitable way to prevent escape of oil therethrough as by plugs 87.

In this embodiment the sleeve 26 has suitably attached thereto, as by bolts or screws 88, a block 89 which may be made in halves if desired and which is of generally frusto-conical form but having cylindrical portions at the extremities thereof. Cylindrical portion 90 at the lower extremity of block 89 cooperates with a sealing ring 91 floatingly carried by a casing member 92 which generally corresponds in configuration with the shape of block 89 and which may be made in halves secured together as by bolts or screws at 93. Casing member 92 may be attached in any suitable way to member 34 for detachment either from above or from below. Block 89 has one or more centrifugal pumping apertures or passages 94 whereby oil is withdrawn from the well 72 and pumped under pressure into the shoe-containing chamber 61. As in the embodiment of Fig. 1, and as hereinafter more particularly referred to in connection with Fig. 9, a viscosity pumping means may be employed if preferred, as by substituting a viscosity pumping ring for the sealing ring 91.

In this embodiment the top of the block 89 carries an upwardly and inwardly extending flange 95 so as to provide a chamber 96 in the top of said block into which chamber the lower ends of the shoes 39 extend. Said chamber 96 constitutes an auxiliary oil well in which the oil is retained when the bearing is at rest, and as the lower extremities of the bearing shoes 39 extend into the oil of said auxiliary well 96, oil may rise by capillary action in the clearances between the surfaces of the shoes and the surface of sleeve 26 so as to maintain a film of oil between said surfaces, thereby facilitating the starting of the bearing and providing a sufficient film of oil until such time as the pump 94 fills the chamber 61 containing the bearing shoes. Otherwise the embodiment of Fig. 2 operates in the same manner as heretofore described in connection with the embodiment of Fig. 1.

In the embodiments of Figs. 1 and 2 the rotatable member of the pumping means is carried by and either formed integrally with or attached to the sleeve 26 which provides the rotatable bearing member. The embodiment of Fig. 3 illustrates a construction wherein the surface of the shaft itself provides the rotatable bearing surface and the rotatable element of the pump is separately mounted on the shaft. Except in respects to be noted the embodiment of Fig. 3 otherwise corresponds with the embodiments of Figs. 1 and 2, similar parts being indicated by like reference characters. As here shown, the rotatable pumping element 100, which may be made in halves suitably secured together as by bolts or screws at 101, is mounted directly on the shaft 25, relative rotation therebetween being prevented in any suitable way as by a key, dowels or other suitable means. Member 100 in this embodiment is more nearly of cylindrical form than the embodiment of Fig. 2, and has a cylindrical surface at 103 at the lower extremity thereof with which cooperates the sealing ring 104, the latter being floatingly carried by a cylindrical casing member 105 which may be made in halves suitably secured together as by bolts or screws at 106 and supported from the member 34 in any suitable way.

In order to provide an extended fit for the member 100 and assure it running true without requiring an undue reduction in the height of the inner wall 31 of pot 32, and also to assure against escape of oil downwardly along the shaft from the auxiliary well 96 and shoe-containing chamber 61 in which oil is maintained under pressure, a separate ring 107, which may be moved into position from below, and which may be made in halves, is suitably attached to the member 100 as by bolts or screws 108. Members 100 and 107 provide a groove at 109 in which suitable packing 110 may be confined under pressure as ring 107 is attached to member 100. Thereby the member 100 is given an extended fit on the shaft, sufficient to prevent misalignment thereof in operation, while the inner wall 31 of the pot 32 may have such height as to confine the desired body of oil therein. Member 100 has one or more centrifugal pump passages 111 therein, but as heretofore explained and as will be apparent from a consideration of Fig. 9 viscosity pumping means may be employed, if preferred, as by substituting a viscosity pumping ring for sealing ring 104. Otherwise the embodiment of Fig. 3 functions as heretofore described in conjunction with the embodiments of Figs. 1 and 2.

It will be observed that the embodiments of Figs. 2 and 3 also have the advantage of ready accessibility from below, as pointed out more particularly in conjunction with the embodiment of Fig. 1. As there pointed out, however, and as will be apparent from inspection, any of these embodiments may be made readily accessible from above by making the connecting or attaching elements accessible from above. Figs. 2 and 3 also illustrate that the invention as so far described is equally available for use with a radial bearing associated with a thrust bearing, as it is apparent that the blocks 89 or 100 may be replaced by a thrust block carrying centrifugal pumping passage or with which is associated a viscosity pumping ring without altering the function of the parts.

Referring next to Fig. 9, the embodiment here illustrated corresponds with that of Fig. 3, like parts being indicated by the same reference characters, except that a viscosity pump is employed to supply oil under pressure to the auxiliary oil well 96 and the chamber 61 containing the bearing shoes. As here illustrated, casing member 115, which may be made in halves suitably secured together as by bolts or screws and suitably secured to member 34, carries in a suitable recess 117 a viscosity pumping ring 118 by which oil may be withdrawn from the well 72 and forced under pressure to and through said chamber 61. As will be apparent to those skilled in the art, any other suitable form of viscosity pumping ring may be used and as heretofore noted block 100 could equally well be a thrust block. A like viscosity pumping ring may also be substituted for the lower sealing ring in the embodiments of Figs. 1 and 2 as well as in the embodiment of Fig. 3.

Referring now to Fig. 4 the embodiment here illustrated shows somewhat diagrammatically the application of the sealing features heretofore disclosed to a thrust bearing. Shaft 120 has mounted thereon or formed integrally therewith a thrust block or collar 121 which cooperates with thrust bearing elements of any suitable type and construction, whether having plane or spherical surfaces and whether of the pivoted shoe or any other suitable type, the same not being shown as the details of the thrust bearing form no part of the present invention. Mounted in any suitable way on a stationary member of the thrust bearing, and floatingly mounted if preferred, is a ring 122, preferably made in halves suitably secured together and comprising lower and intermediate inwardly directed lips or flanges 123 and 124 between which is disposed a groove or recess 125 to receive oil under pressure. Disposed above groove 125 is a downwardly and then upwardly and inwardly curved wall 126 which at its inner extremity 127 has a small clearance with the periphery of the thrust block 121.

Communicating with the groove 125 are one or more centrifugal pumping passages 126 leading from the inner periphery of the thrust collar or other rotatable bearing member to withdraw oil from the well 128 and deliver the same under a substantial pressure to said groove 125. Said inwardly directed lips or flanges 123 and 124 have a small clearance with the periphery of the thrust collar, and therefore the groove 125 is maintained full of oil under a substantial pressure. Said ring is so disposed with respect to the oil level in well 128 that the oil under pressure when it flows from said groove 125 through the clearance at 124 is above the level of the oil in the well. In conformity with the present invention as heretofore explained the oil leaving the groove 125 at 124 flows downwardly in a relatively thin continuous film over a relatively smooth downwardly-inclined surface 129 to the bottom of the chamber 130 formed by wall 129. One or more passages 131 communicate with said chamber 130 and are of sufficient size so as to assure that all of the oil flowing through the clearance at 124 will flow freely away to the oil well without backing up against the periphery of the thrust collar to become aerated as the result of the relative movement thereof.

In place of employing centrifugal pumping means for maintaining the oil in groove 125 under pressure, viscosity pumping means may be utilized for this purpose, and when such is the case, the viscosity pump ring may if preferred be made integral with the ring for confining the oil under pressure. Referring to Figs. 5 and 6, wherein such a construction is shown, the ring 140, which may be floatingly mounted if preferred, has inwardly directed lips or flanges 141, 142, 143 and 144. Lips 141 and 142 define the upper and lower limits of a viscosity pumping groove 145 which has one or more inlet apertures as at 146 at one side of a corresponding number of dams 147 (see Fig. 6), said groove or grooves 145 having a like number of exit openings 148 leading into groove 149 whose upper and lower limits are defined by the lips 143 and 142. Groove 149 corresponds with the groove 125 of Fig. 4 and is designed to be filled with oil under pressure, the ring 140 being so disposed that the oil which flows through the clearance at 143 is above the level of the oil in the well. Groove 149 being maintained full of oil under pressure, said oil is forced upwardly past lip 143 at the clearance between said lip and the peripheral surface of the thrust collar or other rotatable bearing member with which the ring is associated, and thence flows downwardly over the smooth surface 150 into the lower portion of chamber 151, which corresponds with the chamber 130 of Fig. 4. From the latter chamber the oil may return to the well through one or more apertures or passages 152. The upper lip 144 corresponds with the lip 127 in Fig. 4, the small clearance at this point preventing loss of oil, in vapor or other condition.

The embodiment of Figs. 5 and 6 is suitable for bearings wherein the shaft always rotates in the same direction. If the shaft may rotate in either direction, said ring has preferably associated therewith means, automatically reversible upon reversal in the direction of rotation of the shaft, so as to assure the delivery of oil under pressure to the oil sealing groove for either direction of rotation. Referring to Figs. 10, 11 and 12, the viscosity pumping groove 155 is shown as separated into a plurality of segments by interposed dams 156. By preference the oil pumping groove in each embodiment is subdivided into a plurality of segments, preferably of even number, so that the pressures in each of said segments is balanced by the pressure of a corresponding segment diametrically disposed with respect thereto, and therefore unbalanced pressures tending to increase friction by reason of the use of the pumping ring are avoided.

At each end of each groove segment is an aperture 157 and 158 leading from the pumping groove at opposite sides of each dam 156 to a chamber 159 (see Fig. 12) immediately to the rear of the dam. Chamber 159 is closed at its opposite ends by threaded plugs 160 carrying stop projections 161, and disposed in said chamber 159 is a ball 162 which under the pressure of the oil may take up either the full line or the dotted line position as shown in Fig. 12. Leading from chamber 159 is a passage 163 which communicates with the oil pressure groove 164 corresponding with the oil pressure groove 149 of Fig.

5. Otherwise the structure of Figs. 10 to 12 is or may be the same as that illustrated in conjunction with Figs. 5 and 6.

If the thrust collar is rotating with respect to the ring in the direction of the arrow in Fig. 10 oil will flow into each viscosity pump segment 155 through aperture 166 and thence through aperture 157 at one end of each segment. The pressure of the oil thus entering each chamber 159 causes the ball 162 to take up the full line position as shown in Fig. 12 closing off aperture 158. Hence oil entering chamber 159 flows through passage 163 to the oil sealing groove 164. As this action occurs at each chamber 159 associated with each dam 156 all of the oil entering the pumping segments 155 is conveyed under pressure to the sealing groove 164. If the direction of rotation is reversed, oil entering each aperture 166 will flow through each segment 155 to aperture 158, and the pressure of the oil flowing through aperture 158 will cause the ball to move from full line position to dotted line position, as shown in Fig. 12, whereby aperture 157 is closed off, and the oil again flows through passage 163 to the oil sealing groove 164. Hence for either direction of rotation oil sealing groove 164 is maintained full of oil under pressure by the viscosity pump. In place of the valve shown in Fig. 12 any other suitable automatically operated means, effective upon reversal of shaft rotation, may be employed for assuring that oil under pressure is conveyed to the sealing groove. The ring of Figs. 10, 11 and 12 may also be floatingly mounted if preferred.

Alternative forms of sealing and pumping rings are shown in Figs. 14 to 19. Fig. 14 illustrates a viscosity pumping ring 170 that is preferably made in halves suitably united as by bolts 171. Upper and lower inwardly directed lips or flanges 172 and 173 define the upper and lower limits of a viscosity pump cavity 174, which as heretofore explained may be divided into a plurality of segments. Each segment, or the entire pump cavity if only one dam is used, has a suitable inlet and a suitable outlet communicating therewith, which inlet and outlet openings may extend radially through the wall as shown at 175 at the left of Fig. 14 or axially as shown at 176 at the right of Fig. 14. A ring of the form just illustrated may have suitable connections for leading oil from the outlet to any such chamber as 61 in the embodiments described or the outlet may communicate with a sealing ring groove as for example in the embodiment of Figs. 5 and 6. Such a ring may also be used for pumping oil to and from oil cooling means.

Fig. 15 illustrates an oil sealing ring having a pressure oil groove 177 defined at its upper and lower limits by inwardly directed lips or flanges 178 and 179. Oil flowing through the clearance at lip 178 flows over the smooth surface 180 into the lower portion of chamber 181 from which it escapes to the oil well through one or more suitable apertures 182. This ring is shown as designed for stationary support at 183 but if preferred it may be floatingly mounted as disclosed. The ring of this embodiment is preferably made in halves suitably united at 184. The embodiment of Fig. 15 corresponds to the structure used in the embodiment of Fig. 4.

Fig. 16 illustrates an alternative form of viscosity pumping ring that may be used, such as is incorporated in the embodiment of Fig. 9. Ring 185 which is of substantially I cross section has inwardly directed lips or flanges 186 which define the upper and lower limits of the viscosity pumping groove. This ring may be made in one or more pieces as preferred and the pumping groove may be subdivided into a plurality of segments as heretofore explained, each of said segments having suitable inlet and outlet apertures 187.

Fig. 17 illustrates an alternative form of sealing ring 188 that may be employed in place of the L-shaped rings illustrated in Figs. 1 to 3. This ring is preferably mounted to float as in the case of the sealing rings of Figs. 1 to 3 so as to maintain a narrow clearance with respect to the relatively rotatable member, and as in the case of the other sealing and pumping rings disclosed, it may be made in halves, here shown as abutted at 189.

Figs. 18 and 19 disclose the preferred construction of sealing and pumping rings employed, said rings being alike in dimensions so as to facilitate standardization thereof. Fig. 19 illustrates the sealing ring, here shown as made in halves suitably united as by bolts at 190, and said ring interiorly has upper and lower inwardly directed lips or flanges 191 and 192 which define the groove 193 for containing oil under pressure. Even when used as a submerged sealing ring, a sealing ring of the type shown in Fig. 19 has distinctive advantages in that the groove in the inner face of said ring reduces the surface of the ring making small clearance with the periphery of the rotatable member, thereby materially reducing the friction losses arising from the use of such a ring. Said ring has a radially projecting flange 194 so that it may be floatingly mounted as heretofore explained in conjunction with Figs. 1 to 3. Fig. 18 shows a ring of the same construction as just described in connection with Fig. 19, like parts being indicated by the same reference characters, but here the ring is designed to function as a viscosity pump, suitable inlet and outlet apertures as 195 being provided through the wall of the ring so that the groove 196 may act as a viscosity pump under the action of the rotatable member with which it is associated. When used as a pump a suitable dam or dams 197 are provided or secured in the groove 196 to function as understood in the art. The pumping ring of Fig. 18 can readily be made reversible, and that is also true of the ring of Fig. 16.

Referring now to Fig. 20 the common principle underlying the different embodiments of the present invention will be apparent. As here illustrated the ring 200 has three inwardly directed arms 201, 202 and 203. In the simplest form all of said arms may carry combs such as indicated at the inner end of arm 201, and said combs may be floatingly mounted if preferred. As shown, however, the inner end of arm 202 floatingly carries an L-shaped sealing ring 204 such as illustrated in conjunction with Figs. 1 to 3 or it may be of the form shown in Fig. 19. The inner end of arm 203 also floatingly carries a ring 205 which may be a sealing ring like ring 204 if centrifugal pumping means for the chamber 207 is provided as indicated diagrammatically at 206, or ring 205 may be a viscosity pumping ring such as illustrated in Fig. 18 for supplying oil under pressure to chamber 207. In either event, the chamber 207 defined at its upper and lower limits by rings 204 and 205 is maintained full of oil under pressure either by the centrifugal pump 206 or the viscosity pump 205.

Thereby a body of oil under pressure is maintained with its upper defining ring at a level above the oil in the well 208 so that the oil in said well at its free surface does not contact a relatively rotatable member to cause aeration thereof. The oil under pressure in chamber 207 can escape both upwardly and downwardly with respect thereto, but oil escaping to the well past ring 205 is submerged with respect to the body of oil in the well and no aeration will be caused thereby. If desired the lower oil seal ring or its supporting means may be provided with fins or ribs so as to direct the outwardly flowing oil with respect to a cooling coil disposed in said well. The oil escaping past the ring 204 rises to a level above the level of the oil in the well and by reason of the construction and arrangement of the parts, as heretofore explained in detail, all oil flowing through the clearance between ring 204 and the surface of the rotatable bearing member immediately flows away from the rotatable bearing member in a thin film down upright or inclined surfaces into the chamber 209 from which it may return to the well through one or more passages 210. Therefore, no aeration of the oil will occur at this upper limit of the pressure chamber. As the superatmospheric pressure on the oil in said chamber 207 causes the oil to flow outwardly through all clearances rather than permits any air to be drawn inwardly, and as the oil flowing outwardly at ring 204 is immediately conducted away from the rotatable member in a thin downwardly flowing film, no churning of air into the oil can occur because of the use of oil under pressure as a seal.

If, now, we assume the wall of chamber 207 to be lengthened, as indicated by the interruption, said chamber may be made of sufficient length to receive radial bearing elements which may be of the ball or roller bearing type or of the surface type or of the type composed of pivotally mounted shoes as in the embodiments of Figs. 1 to 3. Chamber 207 is still maintained full of oil under superatmospheric pressure by reason of the centrifugal or viscosity pumping means provided, any oil escaping at the lower ring is submerged in the body of oil without opportunity for aeration, and any oil escaping past the ring 204 is immediately conducted away in a thin film, preventing aeration as above explained. If the rotatable bearing member with which the rings 204 and 205 cooperate be assumed to be the periphery of a thrust collar the structure disclosed still functions as heretofore described to prevent aeration. Therefore, the present invention enables the prevention of aeration whether it is used in conjunction with the periphery of a shaft or the periphery of a thrust bearing element, whether the confining rings for the chamber containing oil under superatmospheric pressure be disposed closely adjacent each other to form an oil sealing groove or relatively remote from each other to provide a chamber for radial bearing elements, whether if adjacent each other they are formed integrally as a single ring as in some of the embodiments illustrated or whether they are formed separately as in other embodiments illustrated, and whether the invention be used with a radial bearing or a thrust bearing or a combined thrust and radial bearing.

While the chamber confining oil under pressure may be disposed at approximately the level of the oil in the well, said chamber may be relatively immersed as in Fig. 1 or it may be disposed above the level of the oil as in Figs. 2 and 3, and either viscosity or centrifugal pumping means may convey the oil thereto under pressure. Also, if preferred a viscosity pumping ring may be disposed above the level of the oil in the well and centrifugal pumping means may be utilized for conveying the oil to the viscosity pumping means, or the viscosity pumping means may be supplied with oil led thereto from an external source. Furthermore, in place of supplying the groove or chamber containing oil under pressure with oil by viscosity or centrifugal pumping means, the oil under pressure may be led into and out of the same from an external source, particularly if external cooling means are employed in conjunction with a source of oil under pressure.

By use of floatingly mounted sealing rings as heretofore described the clearance between the periphery of the rotatable member and the inner surface of said ring may be materially reduced as compared with earlier constructions and therefore the oil in the groove or chamber may be kept under a substantial predetermined pressure. If, in the case of radial bearings wherein said chamber contains radial bearing elements, the flow of oil past the sealing rings is not sufficiently rapid to obtain the desired abstraction of heat from the radial bearing members, a supplemental circulation from said chamber may be provided, as by the passages indicated at 211 in Fig. 20, said passages being so selected as to number and size as to maintain the desired back pressure on the oil in said chamber so that the desired superatmospheric pressure is retained but at the same time permitting such circulation of oil as will withdraw heat from the bearing members at the desired rate. When such supplemental circulation is employed the passages 211 should open where aeration of the oil is avoided.

While it is preferred to use sealing rings of the type heretofore described such is not essential if the pumping means used is such as to assure a volume of oil to the pressure chamber sufficient to maintain the desired pressure therein notwithstanding the rate of leakage therefrom, and in such event, the submerged sealing ring may take the form of a comb such as is illustrated at 70 in Fig. 1 or 201 in Fig. 20, in which event said ring may or may not be floatingly mounted as preferred. In fact where only slight pressure is to be retained combs may be used at each sealing ring location, as at the three locations in Fig. 20, or at the two locations in Fig. 1, in which event the comb may be floatingly mounted or not as preferred, but by preference the sealing ring defining the upper limit of the pressure chamber, whether or not the same is associated with a third sealing ring or comb thereabove as in Figs. 1, 2 and 3 and Fig. 19, is of the L-shaped type, with or without a groove at its inner face, and floatingly mounted. In any event the upper sealing ring or upper portion of the sealing ring groove (compare Fig. 4) should be so constructed that the oil escaping from the sealing ring is caused to flow in a thin continuous film over a relatively smooth surface and from a level above the surrounding or adjacent parts so that aeration of the escaping oil by the rotatable member is prevented.

The quantity of oil supplied to the oil pressure groove or chamber can be nicely determined by properly selecting the number and size of the centrifugal pumping passages or the form of the viscosity pump. The pump used must not cause excessive amounts of oil to flow from the upper clearance defining the upper limit of the pressure groove or chamber or otherwise the free flow away in the form of a film will not be obtained and aeration will result.

It will therefore be perceived that by the present invention improved sealing means has been provided which is equally available for thrust or radial or combined thrust and radial bearings and which minimizes aeration of the oil by maintaining a body of oil under pressure in a groove or chamber to cause an outward flow of oil where otherwise inflowing air might result in aeration of the oil by reason of the relative rotation between the associated parts. By floatingly mounting the sealing ring a narrow clearance between the same and the relatively rotatable member or members may be maintained thereby assuring that the desired back pressure is obtained on the oil to keep the oil in the pressure chamber above atmospheric pressure. At the same time the sealing ring is so constructed that the oil escaping from the pressure chamber or groove does not become aerated where it escapes to atmospheric pressure or by reason of the relative rotation of the associated parts at this location, but rather said oil is caused to flow in a relatively thin film away from the location where aeration might result.

An improved radial bearing has also been provided, and said bearing is so constructed as to facilitate the insertion and withdrawal of the pivoted bearing shoes in unitary relationship with a cage ring whether the latter is made in one or more pieces. Improved means for lubricating a radial bearing, whether associated with a thrust bearing or not, have also been provided, and said lubricating means may be used with either centrifugal or viscosity pumping means as preferred. Where the rotatable element of the pump is carried directly by the shaft, means have been provided for obtaining the desired length of fit with the shaft while preventing escape of oil along the shaft without materially reducing the height of the inner wall of the oil-retaining pot. The elements used in the constructions disclosed lend themselves readily to standardization, and therefore the present invention possesses many important advantages of simplicity and economy.

While the embodiments of the invention illustrated on the drawings have been described with considerable particularity, it is to be expressly understood that the invention is not restricted thereto, as the same is capable of receiving a variety of mechanical expressions, some of which will now readily suggest themselves to those skilled in the art, while changes may be made in details of construction, arrangement, proportion, etc., of parts, certain features may be used without other features, features illustrated in conjunction with only some of the embodiments may replace corresponding features of other embodiments, and some of the features, though illustrated only in conjunction with pivoted shoe bearings, are available for use in bearings of other suitable construction. Reference is therefore to be had to the appended claims for a definition of this invention.

What is claimed is:

1. In a radial bearing, in combination with relatively rotatable bearing members, means embracing the relatively stationary bearing member or members and providing a chamber therefor in which oil may be confined under superatmospheric pressure, said means including floatingly mounted sealing means, and means associated with the rotatable bearing member for delivering oil to said chamber under pressure and maintaining the same filled with said oil.

2. In a radial bearing, in combination with relatively rotatable bearing members, means embracing the relatively stationary bearing member or members and providing a chamber therefor in which oil may be confined under superatmospheric pressure, and means associated with the rotatable bearing member for delivering oil to said chamber under pressure and maintaining the same filled with said oil, said confining means including a sealing ring at the extremity of said chamber and having a relatively small clearance with the periphery of the rotatable member with which it is associated and means for floatingly mounting said sealing ring.

3. In a radial bearing for a vertical shaft, in combination with relatively rotatable bearing members, means embracing the relatively stationary bearing member or members and providing a chamber therefor in which oil may be confined under superatmospheric pressure, and means associated with the rotatable bearing member for delivering oil to said chamber under pressure and maintaining the same filled with said oil, said confining means including a sealing ring at the upper extremity of said chamber and having a relatively small clearance with the periphery of the rotatable member with which it is associated and said ring having its wall defining the outer limit of said clearance projecting above the surrounding parts and having an exterior surface directed downwardly from the upper extremity of said clearance whereby oil flowing from said clearance must at once flow downwardly over said upwardly projecting wall and thus away from said rotatable member.

4. In a radial bearing, in combination with a shaft provided with a relatively rotatable bearing surface, a plurality of tiltably mounted shoes cooperating with said surface, means embracing said shoes and cooperating with the rotatable bearing surface to provide a chamber in which oil may be maintained to keep said shoes immersed in oil, said means including floatingly mounted sealing means, and means associated with said shaft for delivering oil to said chamber and maintaining the same filled with oil.

5. In a radial bearing, in combination with a shaft provided with a relatively rotatable bearing surface, a plurality of tiltably mounted shoes cooperating with said surface, means embracing said shoes and cooperating with the rotatable bearing surface to provide a chamber in which oil may be maintained, and means associated with said shaft for delivering oil to said chamber and maintaining the same filled with oil, said confining means including a sealing ring having a relatively small clearance with said rotatable bearing surface and means for floatingly mounting said sealing ring.

6. In a radial bearing, in combination with a vertical shaft provided with a relatively rotatable bearing surface, a plurality of tiltably mounted shoes cooperating with said surface, means embracing said shoes and cooperating with the rotatable bearing surface to provide a chamber in which oil may be maintained, and means associated with said shaft for delivering oil to said chamber and maintaining the same filled with oil, said confining means including at its upper end a sealing ring having a relatively small clearance with said rotatable bearing surface and having its wall which defines the outer limit of said clearance extending above surrounding parts and having an exterior surface directed downwardly from the upper extremity of said clearance whereby oil flowing from said clearance must at once flow downwardly over said upwardly projecting wall and away from said rotatable surface.

7. In a radial bearing, in combination with a shaft provided with a relatively rotatable bearing surface, a plurality of tiltably mounted shoes cooperating with said surface, means embracing said shoes and cooperating with the rotatable bearing surface to provide a chamber in which oil may be maintained, and means associated with said shaft for delivering oil to said chamber and maintaining the same filled with oil, said confining means including at its upper extremity a sealing ring having a relatively small clearance with said rotatable bearing surface and said sealing ring having its wall defining the exterior limits of said clearance projecting above surrounding parts whereby oil flowing from said clearance must flow downwardly and away from said rotatable surface in a relatively thin film, and means for floatingly mounting said sealing ring.

8. In a radial bearing, in combination with a shaft provided with a relatively rotatable bearing surface, a plurality of tiltably mounted shoes cooperating with said rotatable bearing surface, means on which said shoes are tiltably mounted, and means for mounting said shoes as a unit whereby they may be assembled exteriorly of the bearing and separately from said mounting means, said last named means including a cage ring through which said shoes project for engagement with said mounting means when said cage ring is inserted into said bearing into cooperative relation with said mounting means, and means for securing individual shoes in unitary relationship with said ring.

9. In a radial bearing, in combination with a shaft provided with a relatively rotatable bearing surface, a plurality of tiltably mounted shoes cooperating with said rotatable bearing surface, means on which said shoes are tiltably mounted, and means for mounting said shoes as a unit whereby they may be assembled exteriorly of the bearing and separately from said mounting means, said last named means including a cage ring through which said shoes project for engagement with said mounting means when said cage ring is inserted into said bearing into cooperative relation with said mounting means, means for retaining individual shoes in unitary relationship with said ring, and means for preventing relative rotation between each shoe and said ring.

10. In a radial bearing, in combination with a shaft provided with a relatively rotatable bearing surface, a plurality of tiltably mounted shoes cooperating with said rotatable bearing surface, means on which said shoes are tiltably mounted, and means for mounting said shoes as a unit whereby they may be assembled exteriorly of the bearing and separately from said mounting means, said last named means including a cage ring through which said shoes project for engagement with said mounting means when said cage ring is inserted into said bearing into cooperative relation with said mounting means, and means for loosely restraining said shoes in unitary relationship with said ring but permitting relative movement therebetween both axially and circumferentially of said shaft.

11. In a radial bearing, in combination with a shaft provided with a relatively rotatable bearing surface, a plurality of tiltably mounted shoes cooperating with said rotatable bearing surface, means on which said shoes are tiltably mounted, and means for mounting said shoes as a unit whereby they may be assembled exteriorly of the bearing, said last named means including a cage ring through which said shoes project for engagement with said mounting means when said cage ring is inserted into said bearing into cooperative relation with said mounting means, and means for restraining said shoes in unitary relationship with said ring, the inner face of said ring and the rear faces of said shoes being correspondingly shaped to reduce the clearance therebetween to a relatively small amount while permitting relative movement between said shoes and ring both circumferentially and axially with respect to the shaft.

12. In a radial bearing, in combination with a shaft provided with a relatively rotatable bearing surface, a plurality of tiltably mounted shoes cooperating with said rotatable bearing surface, means on which said shoes are tiltably mounted, and means for mounting said shoes as a unit whereby they may be assembled exteriorly of the bearing and separately from said mounting means, said last named means including a cage ring through which said shoes project for engagement with said mounting means when said cage ring is inserted into said bearing into cooperative relation with said mounting means, means for restraining said shoes in unitary relationship with said ring, and cooperating lips and grooves on said shoes and ring for preventing relative rotation between said shoes and ring.

13. In a radial bearing, in combination with a shaft provided with a relatively rotatable bearing surface, a plurality of tiltably mounted shoes cooperating with said rotatable bearing surface, means on which said shoes are tiltably mounted, and means for mounting said shoes as a unit whereby they may be assembled exteriorly of the bearing and separately from said mounting means, said last named means including a cage ring and means for mounting said shoes in unitary relationship with said ring including projections on said shoes extending through apertures in said rings into engagement with said mounting means, and means passing through said projections and engaging slots in said ring to prevent displacement of said extensions from said apertures.

14. In a radial bearing, in combination with a shaft provided with a relatively rotatable bearing surface, a plurality of tiltably mounted shoes cooperating with said rotatable bearing surface, means on which said shoes are tiltably mounted, and means for mounting said shoes as a unit whereby they may be assembled exteriorly of the bearing and separately from said mounting means, said last named means including a cage ring through which said shoes project for engagement with said mounting means, said ring being made in halves adapted to be assembled around the rotatable bearing surface, and means loosely restraining each of said shoes on a cage ring half to prevent relative displacement of said shoes therefrom while permitting tilting of said shoes with respect to said ring both circumferentially and axially with respect to the rotatable bearing surface.

15. In a radial bearing, in combination with a shaft provided with a rotatable bearing surface, a plurality of tiltably mounted bearing shoes cooperating with said rotatable bearing surface, confining means embracing said shoes and providing a chamber therefor in which oil may be maintained under superatmospheric pressure, means providing an oil well, and means associated with said shaft for delivering oil from said well to said chamber and maintaining the oil therein at a pressure above atmospheric, said last-named means including a member rotating with said shaft adjacent said chamber and constituting the movable member of a pump.

16. In a radial bearing, in combination with a shaft provided with a rotatable bearing surface, a plurality of tiltably mounted bearing shoes cooperating with said rotatable bearing surface, confining means embracing said shoes and providing a chamber therefor in which oil may be maintained under superatmospheric pressure, means providing an oil well, and means associated with said shaft for delivering oil from said well to said chamber and maintaining the oil therein at a pressure above atmospheric, said last named means including a member rotating with the shaft and having one or more outwardly directed passages constituting a centrifugal pump.

17. In a radial bearing, in combination with a shaft provided with a rotatable bearing surface, a plurality of tiltably mounted bearing shoes cooperating with said rotatable bearing surface, confining means embracing said shoes and providing a chamber therefor in which oil may be maintained under superatmospheric pressure, means providing an oil well, and means associated with said shaft for delivering oil from said well to said chamber and maintaining the oil therein at a pressure above atmospheric, said last named means including a member rotating with the shaft and a viscosity pump cooperating with the periphery of said member and delivering oil therefrom to said chamber.

18. In a radial bearing, in combination with a shaft provided with a rotatable bearing surface, a plurality of tiltably mounted shoes cooperating with said rotatable bearing surface, means providing an oil well, means embracing said shoes and providing a chamber in which oil may be maintained under pressure, and means for maintaining said chamber full of oil under pressure including a member rotatable with said shaft adjacent said chamber and constituting the movable member of a pump.

19. In a radial bearing, in combination with a shaft provided with a rotatable bearing surface, a plurality of tiltably mounted shoes cooperating with said rotatable bearing surface, means providing an oil well, means embracing said shoes and providing a chamber in which oil may be maintained under superatmospheric pressure, said chamber extending below the level of the oil in said well, and means associated with said shaft for maintaining said chamber full of oil under pressure, said means including a member rotatable with said shaft adjacent said chamber and constituting the movable member of a pump.

20. In a radial bearing, in combination with a shaft provided with a rotatable bearing surface, a plurality of tiltably mounted shoes cooperating with said rotatable bearing surface, means providing an oil well, means embracing said shoes and providing a chamber in which oil may be maintained under superatmospheric pressure, said chamber being disposed above the level of the oil in said well, and means associated with said shaft for elevating oil to said chamber and maintaining said chamber full of oil under pressure, said means including a member rotatable with said shaft adjacent said chamber and constituting the movable member of a pump.

21. In a radial bearing, in combination with a shaft provided with a rotatable bearing surface, a plurality of tiltably mounted shoes cooperating with said rotatable bearing surface, means providing an oil well, means embracing said shoes and providing a chamber in which oil may be maintained under super-atmospheric pressure, and means in communication with said chamber for maintaining the same full of oil under pressure, said means including a member rotatable with said shaft and provided with one or more outwardly directed passages to constitute a centrifugal pump.

22. In a radial bearing, in combination with a shaft provided with a rotatable bearing surface, a plurality of tiltably mounted shoes cooperating with said rotatable bearing surface, means providing an oil well, means embracing said shoes and providing a chamber in which oil may be maintained under superatmospheric pressure, and means cooperating with the periphery of a member rotatable with said shaft and constituting a viscosity pump having its outlet in communication with said chamber for maintaining the same full of oil under pressure.

23. In a radial bearing, in combination with a shaft provided with a rotatable bearing surface, relatively stationary radial bearing means cooperating with said rotatable bearing surface, means embracing said stationary bearing means and providing a chamber therefor, an oil pot containing a body of oil, means for withdrawing oil from said pot and delivering the same to said chamber, said last named means including a member mounted on said shaft adjacent the upper extremity of the inner wall of said pot and projecting downwardly into the oil of said pot, and means attached to said member and extending downwardly below the upper extremity of the inner wall of said pot for lengthening the fit of said rotatable member on said shaft without decreasing the height of the inner wall of said pot.

24. In a radial bearing, in combination with a shaft provided with a rotatable bearing surface, relatively stationary radial bearing means cooperating with said rotatable bearing surface, means embracing said stationary bearing means and providing a chamber therefor, an oil pot containing a body of oil, means for withdrawing oil from said pot and delivering the same to said chamber, said last named means including a member mounted on said shaft adjacent the upper extremity of the inner wall of said pot and projecting downwardly into the oil of said pot, means attached to said member and extending downwardly below the upper extremity of the inner wall of said pot for lengthening the fit of said rotatable member on said shaft without decreasing the height of the inner wall of said pot, said last named means and said rotatable member providing a groove adjacent the surface of said shaft, and packing confined in said groove and pressed against said shaft to prevent leakage of oil downwardly along said shaft from said chamber.

25. In a radial bearing, in combination with a shaft provided with a rotatable bearing surface, a plurality of tiltably mounted shoes cooperating with said rotatable bearing surface, means providing an auxiliary oil well into which the lower extremity of said shoes projects, means cooperating with the rotatable bearing member above said shoes and below said auxiliary oil well to provide a chamber embracing said shoes and in which oil may be maintained under pressure, and means rotatable with said shaft adjacent said chamber for delivering oil to said chamber under pressure and keeping the same filled with oil while the shaft is rotating.

26. In a radial bearing, in combination with a shaft provided with a rotatable bearing surface, a plurality of tiltably mounted shoes cooperating with said bearing surface, a member rotatable with said shaft and disposed below said shoes, means cooperating with said rotatable surface above said shoes and with said member below said shoes to provide a chamber embracing said shoes and in which oil may be maintained under pressure, and means associated with said rotatable member for maintaining said chamber full of oil under pressure.

27. In a radial bearing, in combination with a shaft provided with a rotatable bearing surface, a plurality of tiltably mounted shoes cooperating with said bearing surface, a member rotatable with said shaft and disposed below said shoes, means cooperating with said rotatable surface above said shoes and with said member below said shoes to provide a chamber embracing said shoes and in which oil may be maintained under pressure, means associated with said rotatable member for maintaining said chamber full of oil under pressure, said chamber having a sealing ring cooperating with said rotatable bearing surface above said shoes and providing a relatively narrow clearance between said ring and said rotatable surface, and means for floatingly mounting said sealing ring.

28. In a radial bearing, in combination with a shaft provided with a rotatable bearing surface, a plurality of tiltably mounted shoes cooperating with said bearing surface, a member rotatable with said shaft and disposed below said shoes, means cooperating with said rotatable surface above said shoes and with said member below said shoes to provide a chamber embracing said shoes and in which oil may be maintained under pressure, and means associated with said rotatable member for maintaining said chamber full of oil under pressure, said chamber having a sealing ring cooperating with said rotatable surface above said shoes and said sealing ring projecting upwardly above the level of surrounding parts whereby oil flowing past said ring must flow downwardly and away from said rotatable surface.

29. In a radial bearing, in combination with a shaft provided with a rotatable bearing surface, a plurality of tiltably mounted shoes cooperating with said bearing surface, a member rotatable with said shaft and disposed below said shoes, means cooperating with said rotatable surface above said shoes and with said member below said shoes to provide a chamber embracing said shoes and in which oil may be maintained under pressure, and means associated with said rotatable member for maintaining said chamber full of oil under pressure, said chamber having a sealing ring which cooperates with said rotatable surface and has a relatively narrow clearance therewith, said sealing ring including a wall projecting upwardly above surrounding parts and defining the outer periphery of said clearance whereby oil flowing through said clearance must flow downwardly and away from said rotatable surface in a relatively thin film, and said chamber-forming means providing a floating mounting for said sealing ring.

30. In a radial bearing, in combination with a shaft provided with a rotatable bearing surface, a plurality of tiltably mounted shoes cooperating with said bearing surface, a member rotatable with said shaft and disposed below said shoes, means cooperating with said rotatable surface above said shoes and with said member below said shoes to provide a chamber embracing said shoes and in which oil may be maintained under pressure, and means associated with said rotatable member for maintaining said chamber full of oil under pressure, said chamber having a sealing ring which cooperates with said rotatable surface and has a relatively narrow clearance therewith, said sealing ring including an L-shaped wall projecting upwardly above surrounding parts and defining the outer periphery of said clearance whereby oil flowing through said clearance must flow downwardly and away from said rotatable surface in a relatively thin film, and said chamber-forming means providing a slot in which said ring is floatingly mounted.

31. In a bearing, in combination with relatively rotatable members, means between said bearing and the atmosphere to prevent aeration of oil after it leaves said bearing including means defining a space in which oil may be confined under pressure and having at the extremity of said space where the oil escapes to the atmosphere an axially narrow stationary surface making a relatively narrow clearance with respect to the rotatable surface with which it is associated, and means rotatable with the rotatable member adjacent said space for maintaining said space filled with oil under pressure whereby oil must flow outwardly through said clearance and thereby prevent entry of air at said clearance.

32. In a bearing, in combination with relatively rotatable members, means to prevent aeration of oil including means defining a space in which oil may be confined under pressure and having a relatively narrow clearance with respect to the rotatable surface with which it is associated, means for floatingly mounting said means defining said clearance, and means for maintaining said space filled with oil under pressure whereby oil must flow outwardly through said clearance and thereby prevent entry of air at said clearance.

33. In a bearing, in combination with relatively rotatable members, means between said bearing and the atmosphere to prevent aeration of oil after it leaves said bearing including means defining a space in which oil may be confined under pressure and having at the extremity of said space where the oil escapes to the atmosphere an axially narrow stationary surface making a relatively narrow clearance with respect to the rotatable surface with which it is associated, the outer wall defining said clearance projecting above surrounding parts and having an outer surface inclined downwardly from said rotatable surface whereby oil flowing through said clearance must at once flow downwardly over said upwardly projecting wall and away from the rotatable member, and means rotatable with the rotatable member adjacent said space for maintaining said space filled with oil under pressure.

34. In a bearing, in combination with relatively rotatable members, an oil well for supplying oil to the bearing surfaces of said members, and means between said bearing and the atmosphere for preventing aeration of said oil after it leaves said bearing including means cooperating with a rotatable member above the bearing surfaces of the bearing and defining a peripheral space in which oil may be maintained under pressure, said last named means at its upper limit defining a relatively narrow clearance with respect to the rotatable member with which it is associated and said relatively narrow clearance being disposed above the level of the oil in the well whereby the oil under pressure in said space must flow outwardly through said clearance and indrawing of air through said clearance is prevented, and means rotatable with the rotatable member to maintain said space full of oil under pressure.

35. In a bearing, in combination with relatively rotatable members, an oil well for supplying oil to the bearing surfaces of said members, and means between said bearing and the atmosphere for preventing aeration of said oil after it leaves said bearing including means cooperating with a rotatable member above the bearing surfaces of the bearing and defining a peripheral space in which oil may be maintained under pressure, said last named means defining a relatively narrow clearance at the upper extremity of said space and having an upwardly projecting wall defining the outer limit of said clearance, said last named wall projecting above surrounding parts and the level of the oil in said well whereby oil flowing through said clearance must at once flow downwardly and away from said rotatable member, and means rotatable with the rotatable member to maintain said space full of oil under pressure.

36. In a bearing, in combination with relatively rotatable bearing members, an oil well for supplying oil to the bearing surfaces of said members, and means for preventing aeration of said oil including means cooperating with a rotatable member and defining a peripheral space in which oil may be maintained under pressure, said last named means including a floatingly mounted sealing ring defining and maintaining a relatively narrow clearance with respect to said rotatable member above the level of the oil in said well.

37. In a bearing, in combination with relatively rotatable bearing members, an oil well for supplying oil to the bearing surfaces of said members, and means for preventing aeration of said oil including means cooperating with a rotatable member and defining a peripheral space in which oil may be maintained under pressure, said last named means including a floatingly mounted sealing ring defining the upper limit of said space and having a relatively narrow clearance with the periphery of said rotatable member above the level of the oil in said well, said sealing ring having its interior surface relieved below its upper extremity.

38. In a bearing, in combination with relatively rotatable bearing members, an oil well for supplying oil to the bearing surfaces of said members, and means for preventing aeration of said oil including means cooperating with a rotatable member and defining a peripheral space in which oil may be maintained under pressure, said last named means including means defining a relatively narrow clearance above the level of the oil in said well and at the upper extremity of said space and providing a chamber above said clearance having its inner wall inclined downwardly and away immediately from the exit from said clearance whereby oil escaping through said clearance flows to the bottom of said chamber, means rotatable with the rotatable member to maintain said space full of oil under pressure, and means for returning oil from said chamber to said well.

39. In a bearing, in combination with relatively rotatable bearing members, an oil well for supplying oil to the bearing surfaces of said members, and means between said bearing and the atmosphere for preventing aeration of said oil after it leaves said bearing including means cooperating with a rotatable member at a level above the upper extremity of said bearing members and defining a peripheral space in which oil may be maintained under pressure, said last named means including means defining a relatively narrow clearance at the upper limit of said space and above the level of the oil in said well, and means integral with said space defining means and constituting an element of a pump for maintaining said space filled with oil under pressure.

40. In a bearing, in combination with relatively rotatable bearing members, an oil well for supplying oil to the bearing surfaces of said members, and means between said bearing and the atmosphere for preventing aeration of said oil after it leaves said bearing including means cooperating with a rotatable member at a level above the upper extremity of said bearing members and defining a peripheral space in which oil may be maintained under pressure, said last named means including means defining a relatively narrow clearance at the upper extremity of said space and above the level of the oil in said well, and pumping means including a pump element rotatable with the rotatable bearing member adjacent said space for maintaining said space filled with oil under pressure.

41. In a bearing, in combination with relatively rotatable bearing members, an oil well for supplying oil to the bearing surfaces of said members, and means between said bearing and the atmosphere for preventing aeration of said oil after it leaves said bearing including means cooperating with a rotatable member at a level above the upper extremity of said bearing members and defining a peripheral space in which oil may be maintained under pressure, said last named means including means defining a relatively narrow clearance at the upper extremity of said space and above the level of the oil in said well, and centrifugal pumping means including a pump element rotatable with the rotatable bearing member adjacent said space for maintaining said space filled with oil under pressure.

42. In a bearing, in combination with relatively rotatable bearing members, an oil well for supplying oil to the bearing surfaces of said members, and means for preventing aeration of said oil including means cooperating with a rotatable member at a level above the upper extremity of said bearing members and defining a peripheral space in which oil may be maintained under pressure, said last named means including means defining a relatively narrow clearance at the upper extremity of said space and above the level of the oil in said well, and viscosity pump means for maintaining said space filled with oil under pressure.

43. In a bearing, in combination with relatively rotatable bearing members, an oil well for supplying oil to the bearing surfaces of said members, means for preventing aeration of said oil including means cooperating with a rotatable member at a level above the upper extremity of said bearing members and defining a peripheral space in which oil may be maintained under pressure, said last named means including means defining a relatively narrow clearance at the upper limit of said space and above the level of the oil in said well, and reversible means for maintaining said space filled with oil under pressure.

44. In a bearing, in combination with relatively rotatable bearing members, an oil well for supplying oil to the bearing surfaces of said members, means for preventing aeration of said oil including means cooperating with a rotatable member and defining a peripheral space in which oil may be maintained under pressure, said last named means including means defining a relatively narrow clearance at the upper limit of said space and above the level of the oil in said well, and reversible means for maintaining said space filled with oil under pressure, said last named means including valve means operated by the pressure of the oil on reversal of the direction of rotation of said member.

45. In a bearing, in combination with relatively rotatable bearing members, an oil well for supplying oil to the bearing surfaces of said members, and means for preventing aeration of said oil including means cooperating with a rotatable member and defining a peripheral space in which oil may be maintained under pressure, said last named means including means defining a relatively narrow clearance at the upper limit of said space and above the level of the oil in said well, and means for maintaining said space filled with oil under pressure, said last named means including a viscosity pump ring integral with said space defining means.

46. In a bearing, in combination with a relatively rotatable bearing member, an oil well for supplying oil to said relatively rotatable member, and means between said bearing and the atmosphere for preventing aeration of said oil after it leaves said bearing including means cooperating with a rotatable member and defining a peripheral space in which oil may be maintained under pressure, said last named means including means defining a relatively narrow clearance at the upper limit of said space and above the level of the oil in said well, radial bearing means mounted in said space and immersed in the oil maintained therein, said radial bearing means cooperating with said rotatable bearing member, and means including a pump element rotatable with said rotatable member adjacent said space for maintaining said space filled with oil under pressure.

47. In a bearing, in combination with a relatively rotatable bearing member, an oil well for supplying oil to said relatively rotatable member, and means for preventing aeration of said oil including means cooperating with a rotatable member and defining a peripheral space in which oil may be maintained under pressure, said last named means including means defining a relatively narrow clearance at the upper extremity of said space and above the level of the oil in said well, bearing shoes tiltably mounted in said space and cooperating with said rotatable bearing member, and means including a pump element rotatable with said rotatable member adjacent said space for maintaining said space filled with oil under pressure.

48. In a bearing, in combination with a relatively rotatable bearing member, an oil well for supplying oil to said relatively rotatable member, and means for preventing aeration of said oil including means cooperating with a rotatable member and defining a peripheral space in which oil may be maintained under pressure, said last named means including a floatingly mounted sealing ring having a relatively narrow clearance defining the upper limit of said space and above the level of the oil in said well, radial bearing means mounted in said space and cooperating with said rotatable bearing member, and means for maintaining said space filled with oil under pressure.

49. In a bearing, in combination with a relatively rotatable bearing member, an oil well for supplying oil to said relatively rotatable member, and means for preventing aeration of said oil including means cooperating with a rotatable member and defining a peripheral space in which oil may be maintained under pressure, said last named means including a floatingly mounted sealing ring defining a relatively narrow clearance at the upper limit of said space and above the level of the oil in said well, said sealing ring having its wall projecting upwardly above surrounding parts whereby oil flowing through said clearance must flow downwardly and away therefrom, radial bearing means mounted in said space, and means for maintaining said space filled with oil under pressure.

50. In a bearing, in combination with a relatively rotatable bearing member, an oil well for supplying oil to said relatively rotatable member, means for preventing aeration of said oil including means cooperating with a rotatable member and defining a peripheral space in which oil may be maintained under pressure, said last named means including upper and lower sealing rings defining relatively narrow clearances with said rotatable member and constituting the upper and lower limits of said space, radial bearing means mounted in said space, and means including a pump element rotatable with said rotatable member adjacent said space for maintaining said space filled with oil under pressure.

HARRY A. S. HOWARTH.